(12) United States Patent
Hokoi et al.

(10) Patent No.: US 10,518,768 B2
(45) Date of Patent: Dec. 31, 2019

(54) HYBRID VEHICLE AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Koji Hokoi, Toyota (JP); Koji Yoshihara, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 275 days.

(21) Appl. No.: 15/722,301

(22) Filed: Oct. 2, 2017

(65) Prior Publication Data

US 2018/0148043 A1    May 31, 2018

(30) Foreign Application Priority Data

Nov. 29, 2016  (JP) .................. 2016-230773

(51) Int. Cl.
*B60W 20/40*    (2016.01)
*B60W 20/13*    (2016.01)
(Continued)

(52) U.S. Cl.
CPC ............. *B60W 20/40* (2013.01); *B60K 6/365* (2013.01); *B60K 6/48* (2013.01); *B60L 15/20* (2013.01);
(Continued)

(58) Field of Classification Search
CPC ........... B60W 20/40; B60W 30/18127; B60W 20/14; B60W 30/18136; B60W 10/06; B60W 10/08; B60W 30/20; B60W 2540/16; B60W 2720/30; B60W 2520/10; B60W 2710/083; B60W 2540/10; B60W 2710/0666; B60W 2710/0644; B60L 53/14; B60L 58/13; B60L 50/15; B60L 15/20; B60L 2240/441; B60L 2240/443; B60L 2240/423; B60L 2240/12; B60L 2210/40;
(Continued)

(56) References Cited

U.S. PATENT DOCUMENTS

| 9,440,643 B1 * | 9/2016 | Yamazaki ............. B60W 10/08 |
| 2013/0179007 A1 * | 7/2013 | Dalum .................. H01M 10/48 701/2 |

(Continued)

FOREIGN PATENT DOCUMENTS

| JP | 2013-252853 | 12/2013 |
| JP | 2016-117376 | 6/2016 |

*Primary Examiner* — Mary Cheung
(74) *Attorney, Agent, or Firm* — Finnegan, Henderson, Farabow, Garrett & Dunner, LLP

(57) ABSTRACT

A hybrid vehicle includes: a power generation device including an engine and an electric motor; an electrical storage device configured to exchange electric power with the electric motor; a shift device configured to allow a driver to perform a shift operation for deceleration; and an electronic control unit configured to control the power generation device such that an integral value of braking torque that is output from the power generation device during a period from when depression of an accelerator pedal is released and the shift operation is performed to when a predetermined time elapses in the case where a drive mode is a charge depleting mode is larger than the integral value in the case where the drive mode is a charge sustaining mode.

8 Claims, 5 Drawing Sheets

(51) Int. Cl.
*B60W 30/20* (2006.01)
*B60W 10/06* (2006.01)
*B60W 10/08* (2006.01)
*B60L 15/20* (2006.01)
*B60K 6/365* (2007.10)
*B60K 6/48* (2007.10)
*B60W 30/18* (2012.01)
*B60W 20/14* (2016.01)
*B60L 53/14* (2019.01)
*B60L 50/15* (2019.01)
*B60L 58/13* (2019.01)

(52) U.S. Cl.
CPC .............. *B60L 50/15* (2019.02); *B60L 53/14* (2019.02); *B60L 58/13* (2019.02); *B60W 10/06* (2013.01); *B60W 10/08* (2013.01); *B60W 20/13* (2016.01); *B60W 20/14* (2016.01); *B60W 30/18127* (2013.01); *B60W 30/18136* (2013.01); *B60W 30/20* (2013.01); *B60L 2210/30* (2013.01); *B60L 2210/40* (2013.01); *B60L 2240/12* (2013.01); *B60L 2240/423* (2013.01); *B60L 2240/441* (2013.01); *B60L 2240/443* (2013.01); *B60W 2520/10* (2013.01); *B60W 2540/10* (2013.01); *B60W 2540/16* (2013.01); *B60W 2710/0644* (2013.01); *B60W 2710/0666* (2013.01); *B60W 2710/083* (2013.01); *B60W 2720/30* (2013.01); *Y02T 10/6239* (2013.01); *Y02T 10/6286* (2013.01); *Y02T 10/7077* (2013.01); *Y10S 903/93* (2013.01)

(58) Field of Classification Search
CPC ....... B60L 2210/30; B60K 6/365; B60K 6/48; Y02T 10/7077; Y02T 10/6239; Y10S 903/93
See application file for complete search history.

(56) References Cited

U.S. PATENT DOCUMENTS

2016/0082842 A1* 3/2016 Perkins .................... B60T 1/10 701/22
2016/0176310 A1  6/2016 Sato et al.

* cited by examiner

HYBRID VEHICLE AND CONTROL METHOD FOR HYBRID VEHICLE

INCORPORATION BY REFERENCE

The disclosure of Japanese Patent Application No. 2016-230773 filed on Nov. 29, 2016 including the specification, drawings and abstract is incorporated herein by reference in its entirety.

BACKGROUND

1. Technical Field

This disclosure relates to a hybrid vehicle that includes a power generation device, including an engine and an electric motor, and an electrical storage device configured to exchange electric power with the electric motor, and a control method for the hybrid vehicle.

2. Description of Related Art

Conventionally, there is known a hybrid vehicle of this type, which is able to set any one of a charge depleting (CD) mode and a charge sustaining (CS) mode as the drive mode of the vehicle (see, for example, Japanese Patent Application Publication No. 2013-252853 (JP 2013-252853 A)). When the CD mode is set as the drive mode, the hybrid vehicle is preferentially set to an EV running state (electric vehicle running state) in which the hybrid vehicle travels with the use of only the electric motor such that consumption of electric power stored in the electrical storage device is accelerated is preferentially set while being allowed to travel in an HV running state (hybrid vehicle running state) in which the engine is additionally operated. When the CS mode is set as the drive mode, the hybrid vehicle is changed as needed between the HV running state and the EV running state such that the state of charge (SOC) of the electrical storage device is kept within a predetermined range. Furthermore, there is known a controller for a hybrid vehicle, which increases a vehicle driving torque for the same vehicle speed and the same accelerator operation amount when the CD mode is selected as compared to when the CS mode is selected (see, for example, Japanese Patent Application Publication No. 2016-117376 (JP 2016-117376 A)).

SUMMARY

As in the case of the hybrid vehicle described in JP 2016-117376 A, it is possible to achieve special running in the CD mode by changing the driving three characteristics of the vehicle between the CD mode and the CS mode. On the other hand, a deceleration feeling at the time when a shift operation for deceleration has been performed desirably does not vary irrespective of the drive mode so as not to make a driver experience a feeling of strangeness. However, the deceleration feeling varies depending on whether there is a change in engine rotation speed (engine sound). While the vehicle is traveling in the CD mode that gives a higher priority to the EV running state, changing the engine rotation speed (engine sound) in response to a shift operation for deceleration is unnatural on the contrary. For this reason, in the hybrid vehicle in which the CD mode or the CS mode is selectively set as the drive mode, there may be a difference in deceleration feeling between the CD mode and the CS mode.

The disclosure of the disclosure provides a hybrid vehicle of which a drive mode is selectively set to the CD mode or the CS mode and that suppresses a difference in deceleration feeling at the time of a shift operation for deceleration between the CD mode and the CS mode.

A first aspect of the disclosure provides a hybrid vehicle. The hybrid vehicle includes a power generation device, an electrical storage device, a shift device and an electronic control unit. The power generation device includes an engine and an electric motor. The electrical storage device is configured to exchange electric power with the electric motor. The shift device is configured to allow a driver to perform a shift operation for deceleration. The electronic control unit is configured to control the power generation device such that an integral value of braking torque when a drive mode of the hybrid vehicle is a charge depleting mode is larger than the integral value of the braking torque when the drive mode is a charge sustaining mode. The braking torque is a torque that is output from the power generation device during a period from when depression of an accelerator pedal is released and the shift operation is performed to when a predetermined time elapses.

With the above configuration, the electronic control unit of the hybrid vehicle controls the power generation device such that the integral value of braking torque that is output during the period from when depression of the accelerator pedal is released and the shift operation for deceleration is performed to when the predetermined time elapses in the case where the drive mode is the charge depleting mode is larger than the integral value in the case where the drive mode is the charge sustaining mode. Thus, when the drive mode is the charge depleting mode, even when the engine rotation speed (engine sound) is not changed, it is possible to compensate for deterioration of a deceleration feeling due to no change in the engine rotation speed, that is, a deficiency of atmospheric deceleration feeling. As a result, it is possible to suppress a difference in deceleration feeling between the charge depleting mode and the charge sustaining mode at the time when the shift operation for deceleration is performed. The predetermined time may be, for example, a time that is taken from when depression of the accelerator pedal is released and the shift operation is performed to when the braking torque converges to substantially a constant value.

The electronic control unit may be configured to control the power generation device such that a first period when the drive mode is the charge depleting mode is longer than the first period when the drive mode is the charge sustaining mode. The first period may be a period that is taken from when depression of the accelerator pedal is released and the shift operation is performed to when the braking torque converges. With the above configuration, it is possible to increase the integral value of the braking torque such that the integral value in the case where the drive mode is the charge depleting mode is larger than the integral value in the case where the drive mode is the charge sustaining mode.

The electronic control unit may be configured to control the power generation device such that a maximum value of the braking torque when the drive mode is the charge depleting mode is larger than the maximum value of the braking torque when the drive mode is the charge sustaining mode. With the above configuration, it is possible to set the integral value of the braking torque such that the integral value in the case where the drive mode is the charge depleting mode is larger than the integral value in the case where the drive mode is the charge sustaining mode.

The electronic control unit may be configured to control the power generation device such that a second period when the drive mode is the charge depleting mode is shorter than the second period when the drive mode is the charge sustaining mode. The second period may be a period from when depression of the accelerator pedal is released and the shift operation is performed to when the braking torque reaches a maximum value.

The electronic control unit may be configured to set a required braking torque of the power generation device such that the required braking torque varies to a second target braking torque in accordance with a second rate after the required braking torque varies to a first target braking torque in accordance with a first rate in response to a release of depression of the accelerator pedal and the shift operation. The second target braking torque may be smaller as a braking torque than the first target braking torque. The electronic control unit may be configured to vary at least one of the first target braking torque, the second target braking torque, the first rate and the second rate between the charge depleting mode and the charge sustaining mode such that the integral value of the braking torque when the drive mode is the charge depleting mode is larger than the integral value when where the drive mode is the charge sustaining mode. With the above configuration, by changing at least one of the first target braking torque, the second target braking torque, the first rate and the second rate between the CD mode and the CS mode, it is possible to set the integral value of the braking torque such that the integral value when the drive mode is the charge depleting mode is larger than the integral value when the drive mode is the charge sustaining mode.

The electronic control unit may be configured to control the power generation device such that the power generation device outputs the braking torque without changing a rotation speed of the engine in response to a release of depression of the accelerator pedal and the shift operation when the drive mode is the charge depleting mode. The electronic control unit may be configured to control the power generation device such that the power generation device outputs the braking torque while the rotation speed of the engine is changed in response to a release of depression of the accelerator pedal and the shift operation when the drive mode is the charge sustaining mode.

The shift device may be configured to allow the driver to select one of a drive position and a brake position, and the shift operation may be a shift change from the drive position to the brake position. However, the shift operation for deceleration may be a downshift operation of a plurality of predetermined virtual shift stages, or a downshift operation of a stepped transmission coupled to the power generation device.

A second aspect of the disclosure provides a control method for a hybrid vehicle. The hybrid vehicle includes a power generation device, an electrical storage device, a shift device, and an electronic control unit. The power generation device includes an engine and an electric motor. The electrical storage device is configured to exchange electric power with the electric motor. The shift device is configured to allow a driver to perform a shift operation for deceleration. The control method includes controlling, by the electronic control unit, the power generation device such that an integral value of braking torque when a drive mode of the hybrid vehicle is a charge depleting mode is larger than the integral value of the braking torque when the drive mode is a charge sustaining mode. The braking torque that is output from the power generation device during a period from when depression of an accelerator pedal is released and the shift operation is performed to when a predetermined time elapses.

With the above configuration, it is possible to suppress a difference in deceleration feeling between the charge depleting mode and the charge sustaining mode at the time when the shift operation for deceleration is performed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, an embodiment of the disclosure of the disclosure will be described with reference to the accompanying drawings.

Figure 1:
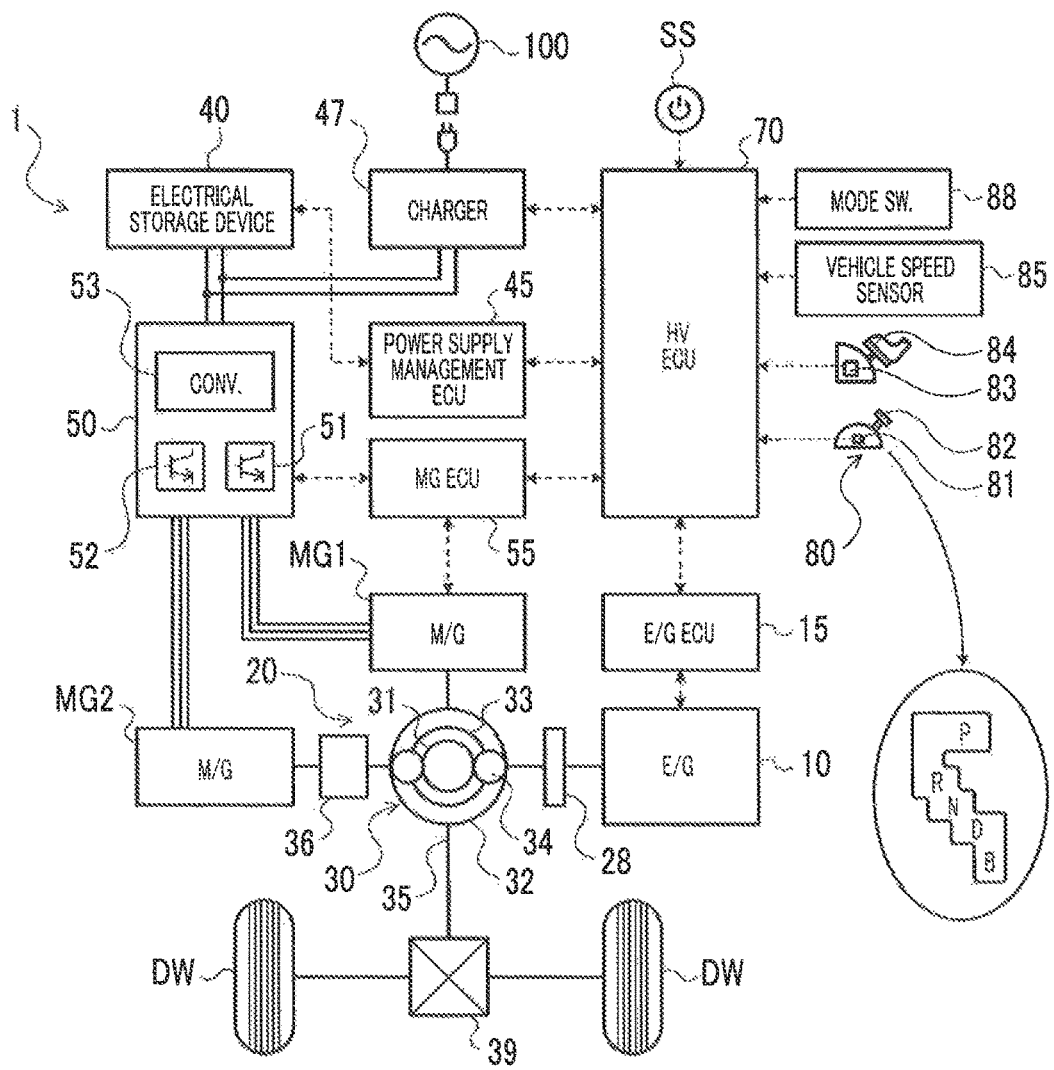
FIG. 1 is a schematic configuration view that shows a hybrid vehicle according to the disclosure.

FIG. 1 is a schematic configuration view that shows a hybrid vehicle 1 according to the disclosure. The hybrid vehicle 1 shown in FIG. 1 includes an engine 10, a single pinion planetary gear 30, motor generators MG1, MG2, an electrical storage device 40, a power control unit (hereinafter, referred to as PCU) 50, and a hybrid electronic control unit (hereinafter, referred to as HV ECU) 70. Each of the motor generators MG1, MG2 is a synchronous generator-motor. The PCU 50 is connected to the electrical storage device 40, and drives the motor generators MG1, MG2. The HV ECU 70 controls the overall vehicle. In the hybrid vehicle 1, the engine 10, the planetary gear 30, and the motor generators MG1, MG2 constitute a hybrid power generation device 20.

The engine 10 is an internal combustion engine that generates power through explosive combustion of a mixture of air and hydrocarbon fuel, such as gasoline, light oil and LPG. The engine 10 is controlled by an engine electronic control unit (hereinafter, referred to as engine ECU) 15 that is a microcomputer that includes a CPU, and the like (not shown).

The planetary gear 30 includes a sun gear 31, a ring gear 32 and a planetary carrier 34. The sun gear 31 is connected to the rotor of the motor generator MG1. The ring gear 32 is connected to a drive shaft 35, and is coupled to the rotor of the motor generator MG2 via a speed reducer 36. The planetary carrier 34 supports a plurality of pinion gears 33 such that each pinion gear 33 is rotatable, and is coupled to the crankshaft (output shaft) of the engine 10 via a damper 28. The drive shaft 35 is coupled to right and left wheels (drive wheels) DW via a gear train (not shown) and a differential gear 39. Instead of the speed reducer 36, a transmission that is able to set a speed ratio between the rotor of the motor generator MG2 and the drive shaft 35 in multiple steps may be employed.

The motor generator MG1 mainly operates as a generator that generates electric power by using at least part of power from the engine 10 that is operated under a load. The motor generator MG2 mainly operates as an electric motor that generates power when driven by using at least any one of electric power from the electrical storage device 40 and electric power from the motor generator MG1, and outputs a regenerative braking torque at the time of braking of the hybrid vehicle 1. Each of the motor generators MG1, MG2 exchanges electric power with the electrical storage device 40 via the PCU 50.

The electrical storage device 40 is, for example, a lithium-ion secondary battery or nickel-metal hydride secondary battery having a rated output voltage of 200 to 300 V. The electrical storage device 40 is managed by a power supply management electronic control unit (hereinafter, referred to as power supply management ECU) 45 that is a microcomputer including a CPU, and the like (not shown). The power supply management ECU 45 calculates the SOC (charging rate) of the electrical storage device 40, an allowable charging power Win, an allowable discharging power Wout, and the like, on the basis of a terminal voltage VB from a voltage sensor for the electrical storage device 40, a charge/discharge current IB from a current sensor, a battery temperature Tb from a temperature sensor, and the like. The electrical storage device 40 may be a capacitor, or may include both a secondary battery and a capacitor.

The hybrid vehicle 1 according to the present embodiment is configured as a plug-in hybrid vehicle that is able to charge the electrical storage device 40 with electric power from an external power supply 100, such as a domestic power supply. The hybrid vehicle 1 includes a charger 47 connected to a power line that connects the electrical storage device 40 to the PCU 50. The charger 47 includes an AC/DC converter, a DC/DC converter, and the like (any of which is not shown), and is controlled by the HV ECU 70 in the present embodiment. The AC/DC converter converts alternating-current power, which is supplied from the external power supply 100 via a power supply plug, to direct-current power. The DC/DC converter converts the voltage of direct-current power from the AC/DC converter, and supplies the direct-current power to the electrical storage device 40.

The PCU 50 includes a first inverter 51, a second inverter 52, a step-up converter (voltage conversion module) 53, and the like. The first inverter 51 drives the motor generator MG1. The second inverter 52 drives the motor generator MG2. The step-up converter 53 is able to step up electric power from the electrical storage device 40 and is able to step down electric power from the motor generators MG1, MG2. The PCU 50 is controlled by a motor electronic control unit (hereinafter, referred to as MG ECU) 55 that is a microcomputer including a CPU, and the like (not shown). The MG ECU 55 receives a command signal from the HV ECU 70, a voltage before being stepped up by the step-up converter 53, a voltage after being stepped up by the step-up converter 53, detected values of resolvers (not shown) that respectively detect the rotational positions of the rotors of the motor generators MG1, MG2, phase currents that are applied to the motor generators MG1, MG2, and the like. The MG ECU 55 executes switching control over the first and second inverters 51, 52 and the step-up converter 53 on the basis of these received signals. The MG ECU 55 calculates the rotation speed Nm1 of the rotor of the motor generator MG1 on the basis of the detected value of the corresponding resolver. The MG ECU 55 calculates the rotation speed Nm2 of the rotor of the motor generator MG2 on the basis of the detected value of the corresponding resolver.

The HV ECU 70 is a microcomputer including a CPU, a ROM, a RAM, an input/output device, and the like, and exchanges various signals with the ECUs 15, 45, 55, and the like, via a network (CAN). In addition, the HV ECU 70 receives, for example, a signal from a start switch (ignition switch) SS, a shift position SP of a shift lever 82, an accelerator operation amount Acc, a vehicle speed V, the rotation speed Nm1 of the motor generator MG1, the rotation speed Nm2 of the motor generator MG2, and the like. The signal from the start switch (ignition switch) SS is to provide instructions for a system startup of the hybrid vehicle 1. The shift position SP is detected by a shift position sensor 81 incorporated in a shift device 80. The accelerator operation amount Acc indicates the depression amount of an accelerator pedal 84. The depression amount of the accelerator pedal 84 is detected by an accelerator pedal position sensor 83. The vehicle speed V is detected by a vehicle speed sensor 85. The rotation speed Nm1 of the motor generator MG1 and the rotation speed Nm2 of the motor generator MG2 are supplied from the MG ECU 55.

When the hybrid vehicle 1 travels, the HV ECU 70 sets a required torque (required braking torque) Tr* to be output to the drive shaft 35 on the basis of the accelerator operation amount Acc and the vehicle speed V, and sets a required power P* that is required of the overall hybrid vehicle 1 on the basis of the required torque Tr*, a target charge/discharge power Pb* based on the SOC of the electrical storage device 40, and the like. In addition, the HV ECU 70 determines whether to operate the engine 10 under a load on the basis of the required torque Tr*, the required power P*, the SOC of the electrical storage device 40, and the like. When the engine 10 is operated under a load, the HV ECU 70 sets the required power P* to a target power Pe* of the engine 10, and sets a target rotation speed Ne* of the engine 10 based on the target power Pe*. Furthermore, the HV ECU 70 sets a torque command Tm1* to the motor generator MG1 and a torque command Tm2* to the motor generator MG2 on the basis of the required torque Tr*, the target rotation speed Ne*, and the like. On the other hand, when the operation of the engine 10 is stopped, the HV ECU 70 sets the target power Pe*, the target rotation speed Ne* and the torque command Tm1* to a value of 0, and sets the torque command Tm2* such that a torque based on the required torque Tr* is output from the motor generator MG2 to the drive shaft 35.

The HV ECU 70 transmits the target power Pe* and the target rotation speed Ne* to the engine ECU 15, and transmits the torque command Tm1* and the torque command Tm2* to the MG ECU 55. The engine ECU 15 executes intake air amount control, fuel injection control, ignition timing control, and the like, on the basis of the target power Pe*, and the like. The MG ECU 55 executes switching control over the first and second inverters 51, 52 and the step-up converter 53 on the basis of the torque command Tm1* and the torque command Tm2*. When the engine 10 is operated under a load, the motor generators MG1, MG2 are controlled so as to convert part (during charging) or all (during discharging) of power that is output from the engine 10 into a torque together with the planetary gear 30 and output the torque to the drive shaft 35. Thus, the hybrid vehicle 1 travels (in an HV running state) by using power from the engine 10 (direct torque) and power from the motor generator MG2. When the operation of the engine 10 is stopped, the hybrid vehicle 1 travels (in an EV running state) by using power from the motor generator MG2.

In addition, the HV ECU 70 sets any one of a CD mode and a CS mode as the drive mode of the hybrid vehicle 1 on the basis of the SOC of the electrical storage device 40. In the CD mode, the EV running state in which the operation of the engine 10 is stopped is given a higher priority than the HV running state in which the engine 10 is operated, and consumption of electric power stored in the electrical storage device 40 is facilitated. In the CS mode, the HV running state is given a higher priority than the EV running state. In this way, in the plug-in hybrid vehicle 1 including the electrical storage device 40 that is chargeable with electric power from the external power supply 100, by making it possible to set any one of the CD mode and the CS mode, it is possible to improve fuel efficiency by further increasing an opportunity that the hybrid vehicle 1 travels in the EV running state.

Specifically, when the SOC of the electrical storage device 40 exceeds a predetermined first threshold S1 (for example, a value of about 45 to 55%) at the system startup (for example, just after the electrical storage device 40 has been charged with electric power from the external power supply 100), the HV ECU 70 sets the CD mode for the drive mode, and sets a drive mode flag Fm to a value of 1. When the CD mode is set for the drive mode, the target charge/discharge power Pb* of the electrical storage device 40 is set to a value of 0, and a start determination threshold (for example, an engine start determination torque, an engine start determination power, or the like) of the engine 10, determined to make it difficult to start the engine 10 as compared to when the CS mode is set, is used. Thus, when the CD mode is set, the hybrid vehicle 1 is able to preferentially travel in the EV running state over the HV running state.

When the SOC of the electrical storage device 40 becomes lower than or equal to a second threshold S2 (for example, a value of about 25 to 35%) lower than the first threshold S1 while the hybrid vehicle 1 is traveling in a state where the CD mode is set, the HV ECU 70 changes the drive mode from the CD mode to the CS mode, and sets the drive mode flag Fm to a value of 0. While the hybrid vehicle 1 is traveling in a state where the CS mode is set, the engine 10 and the motor generators MG1, MG2, that is, the power generation device 20, is controlled such that the SOC of the electrical storage device 40 falls within a predetermined range.

In addition, in the present embodiment, a mode switch 88 is electrically connected to the HV ECU 70. The mode switch 88 allows a driver to change the drive mode between the CD mode and the CS mode. Thus, the driver of the hybrid vehicle 1 is allowed to select a desired one of the CD mode and the CS mode as the drive mode by operating the mode switch 88. When the HV ECU 70 determines that the driver has selected the CD mode on the basis of a signal from the mode switch 88, the HV ECU 70 sets the drive mode flag Fm to a value of 1. When the HV ECU 70 determines that the driver has selected the CS mode, the HV ECU 70 sets the drive mode flag Fm to a value of 0.

As shown in FIG. 1, a parking position (P position), a reverse traveling reverse position (R position), a neutral position (N position), a normal forward traveling drive position (D position) and a brake position (B position) are prepared as the shift position SP of the shift lever 82 in the shift device 80 of the hybrid vehicle 1. When the B position is selected by the driver as the shift position SP, the engine 10 and the motor generators MG1, MG2 (power generation device 20) are controlled such that a braking torque (braking force) that is output from the power generation device 20 in an accelerator off state where depression of the accelerator pedal 84 (and a brake pedal (not shown)) is released is larger than the braking torque when the D position is selected. Thus, as a result of a shift change from the D position to the B position, that is, a shift operation for deceleration, it is possible to more quickly decelerate the hybrid vehicle 1 in the accelerator off state than when the D position is selected.

Next, the operation of the hybrid vehicle 1 at the time when depression of the accelerator pedal 84 is released by the driver and the B position is selected as the shift position SP in the shift device 80 will be described with reference to FIG. 2 and FIG. 3.

Figure 2:
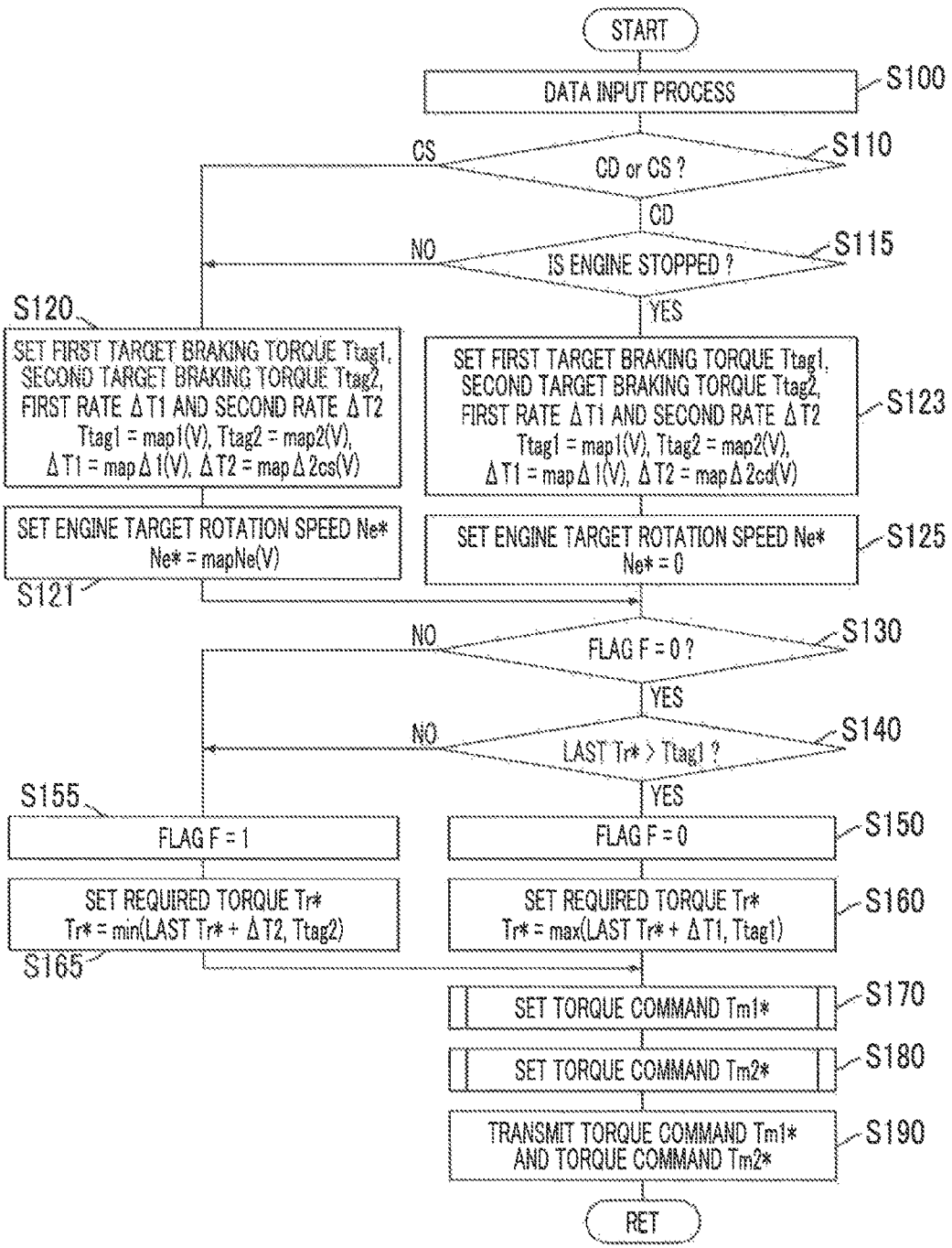
FIG. 2 is a flowchart that shows an example of a routine that is executed at the time when depression of an accelerator pedal is released and a shift position is a brake position in the hybrid vehicle shown in FIG. 1.
Figure 3:
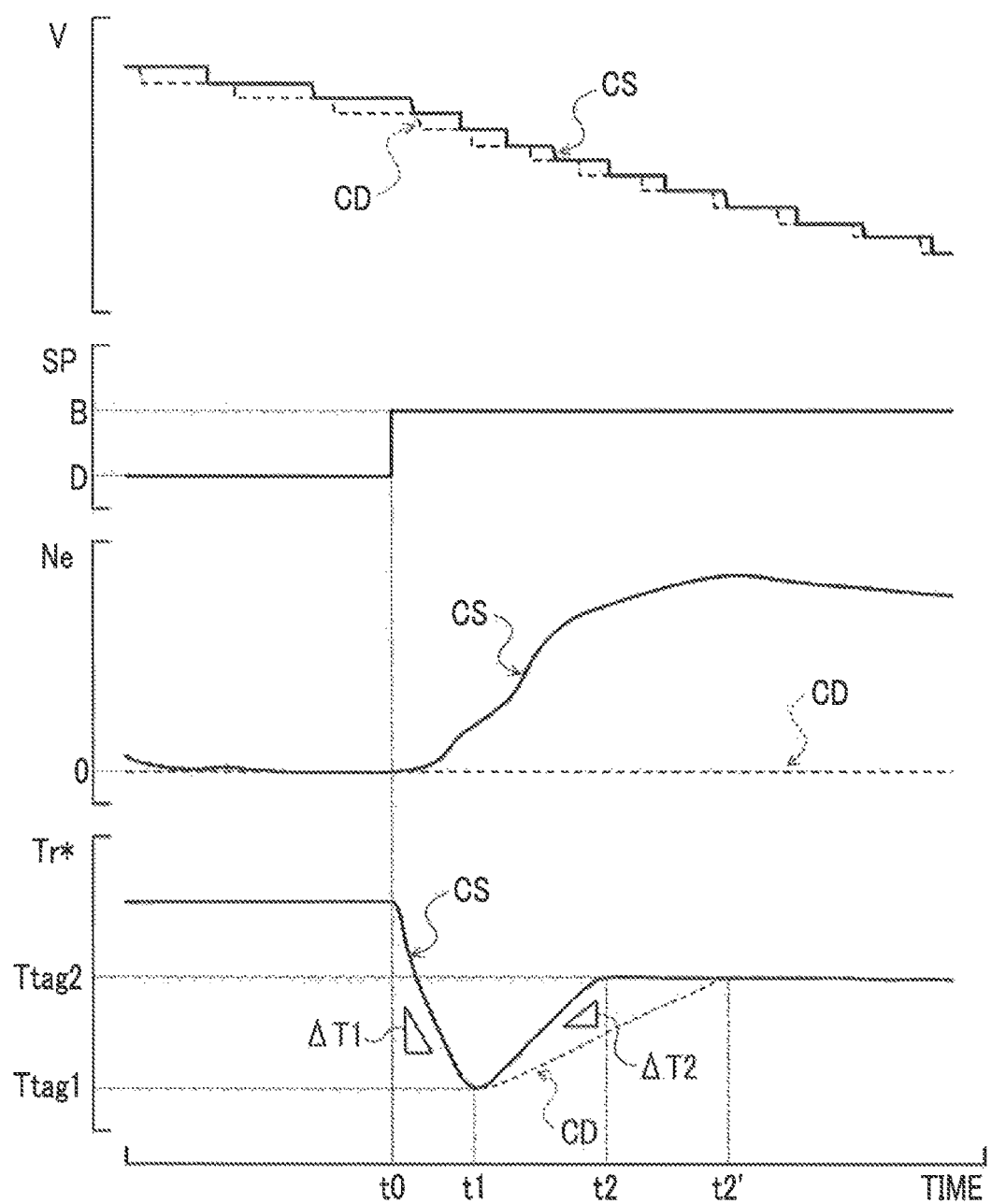
FIG. 3 is a timing chart that illustrates temporal changes in vehicle speed, shift position, engine rotation speed and required torque of the hybrid vehicle at the time when the routine shown in FIG. 2 is executed.

FIG. 2 is a flowchart that shows an example of a routine that is repeatedly executed at predetermined time intervals (for example, several milliseconds) by the HV ECU 70 at the time when depression of the accelerator pedal 84 is released by the driver and the shift position SP is the B position. At the time of the start of the routine shown in FIG. 2, the HV ECU 70 (CPU) initially executes the process of inputting data required for control, that is, the accelerator operation amount Acc from the accelerator pedal position sensor 83, the vehicle speed V from the vehicle speed sensor 85, the allowable charging power Win and allowable discharging power Wout of the electrical storage device 40 from the power supply management ECU 45, the rotation speed Nm1 of the motor generator MG1 from the MG ECU 55, the rotation speed Nm2 of the motor generator MG2 from the MG ECU 55, and the value of the drive mode flag Fm (step S100).

Subsequently, the HV ECU 70 determines whether the drive mode of the hybrid vehicle 1 is any one of the CD mode and the CS mode on the basis of the value of the drive mode flag Fm, input in step S100 (step S110). When it is determined in step S110 that the drive mode is the CS mode, the HV ECU 70 sets a first target braking torque Ttag1, a second target braking torque Ttag2, a first rate ΔT1 and a second rate ΔT2 on the basis of the vehicle speed V input in step S100 (step S120).

The first target braking torque Ttag1 is the maximum value (negative value) of braking torque to be output from the power generation device 20 to the drive shaft 35 in response to driver's release of depression of the accelerator pedal 84 and selection of the B position. The second target braking torque Ttag2 is a target value (negative value) for reducing a braking torque that is output to the drive shaft 35 after the braking torque has reached the first target braking torque Ttag1 (maximum value), and is a value smaller as a braking torque (smaller in absolute value) than the first target braking torque Ttag1 corresponding to the same vehicle speed V. Furthermore, the first rate ΔT1 is a variation (negative value) per unit time (the interval of execution of the routine shown in FIG. 2) in braking torque from when depression of the accelerator pedal 84 is released and the B position is selected to when a braking torque that is output to the drive shaft 35 reaches the first target braking torque Ttag1. The second rate ΔT2 is a variation (positive value) per unit time (the interval of execution of the routine shown in FIG. 2) in braking torque from when a braking torque that is output to the drive shaft 35 reaches the first target braking torque Ttag1 to when the braking torque reaches the second target braking torque Ttag2.

In the present embodiment, a first target braking torque setting map (not shown) and a second target braking torque setting map (not shown) are prepared in advance, and both maps are stored in the ROM (not shown) of the HV ECU 70. The first target braking torque setting map defines the relationship between the vehicle speed V and the first target braking torque Ttag1. The second target braking torque setting map defines the relationship between the vehicle speed V and the second target braking torque Ttag2. The first and second target braking torque setting maps that are used when the B position is selected are created such that an integral value of braking torque that is output from the power generation device 20 during a period from when depression of the accelerator pedal 84 is released and the B position is selected to when a predetermined time elapses is larger than the integral value when the D position is selected. In step S120, the HV ECU 70 derives the first target braking torque Ttag1 corresponding to the vehicle speed V input in step S100 from the first target braking torque setting map, and derives the second target braking torque Ttag2 corresponding to the vehicle speed V input in step S100 from the second target braking torque setting map.

In the present embodiment, a first rate setting map (not shown) and a CS mode-exclusive second rate setting map are created in advance, and both maps are stored in the ROM (not shown) of the HV ECU 70. The first rate setting map defines the relationship between the vehicle speed V and the first rate ΔT1. The CS mode-exclusive second rate setting map defines the relationship between the vehicle speed V and the second rate ΔT2 when the CS mode is set. In step S120, the HV ECU 70 derives the first rate ΔT1 corresponding to the vehicle speed V input in step S100 from the first rate setting map, and derives the second rate ΔT2 corresponding to the vehicle speed V input in step S100 from the CS mode-exclusive second rate setting map.

After the process of step S120, the HV ECU 70 sets the target rotation speed Ne* of the engine 10 on the basis of the vehicle speed V input in step S100 (step S121). In the present embodiment, a target rotation speed setting map (not shown) that defines the relationship between the vehicle speed V and the target rotation speed Ne* of the engine 10 in the accelerator off state is created in advance, and the target rotation speed setting map is stored in the ROM (not shown) of the HV ECU 70. The target rotation speed setting map that is used in step S121 is created as follows. The relationship between the rotation speed of the engine 10 and a friction torque that is output from the engine 10 in a state where fuel is cut off in response to a release of depression of the accelerator pedal 84 is determined in advance by experiment and analysis, and then a target rotation speed Ne* is allocated for each vehicle speed V in consideration of a braking torque that is required in the accelerator off state. The target rotation speed setting map is basically created such that the target rotation speed Ne* is defined as a larger value as the vehicle speed V increases. In step S121, the HV ECU 70 derives the target rotation speed Ne* corresponding to the vehicle speed V input in step S100 from the target rotation speed setting map.

On the other hand, when it is determined in step S110 that the drive mode is the CD mode, the HV ECU 70 determines whether the operation of the engine 10 is stopped (step S115). When the engine 10 is being operated (started), the HV ECU 70 executes the above-described processes of step S120 and step S121. When it is determined in step S110 that the drive mode is the CD mode and it is determined in step S115 that the operation of the engine 10 is stopped, the HV ECU 70 sets the first target braking torque Ttag1, the second target braking torque Ttag2, the first rate ΔT1 and the second rate ΔT2 on the basis of the vehicle speed V input in step S100 (step S123).

In step S123, the HV ECU 70 derives the first target braking torque Ttag1 corresponding to the vehicle speed V input in step S100 from the above-described first target braking torque setting map, and derives the second target braking torque Ttag2 corresponding to the vehicle speed V input in step S100 from the above-described second target braking torque setting map. In step S120, the HV ECU 70 derives the first rate ΔT1 corresponding to the vehicle speed V input in step S100 from the above-described first rate setting map.

In the present embodiment, in addition to the CS mode-exclusive map that defines the relationship between the vehicle speed V and the second rate ΔT2 at the time when the CS mode is set, a CD mode-exclusive map that defines the relationship between the vehicle speed V and the second rate ΔT2 at the time when the CD mode is set is prepared as the second rate setting map that defines the relationship between the vehicle speed V and the second rate ΔT2. The CD mode-exclusive second rate setting map is created such that the value of the second rate ΔT2 corresponding to the same vehicle speed V is smaller than the value of the second rate ΔT2 in the CS mode-exclusive second rate setting map. In step S120, the HV ECU 70 derives the second rate ΔT2 corresponding to the vehicle speed V input in step S100 from the CD mode-exclusive second rate setting map. Thus, when the vehicle speed of the hybrid vehicle 1 is substantially the same, the second rate ΔT2 at the time when the CD mode is set is smaller than the second rate ΔT2 at the time when the CS mode is set. After the process of step S123, the HV ECU 70 sets the target rotation speed Ne* of the engine 10 to a value of 0 (step S125).

After the target rotation speed Ne* is set in step S121 or step S125, the HV ECU 70 determines whether the predetermined flag F is set at a value of 0 (step S130). When it is determined in step S130 that the flag F is set at a value of 0, the HV ECU 70 determines whether the required torque Tr* (last value) set just before the current execution (at the time of last execution) of the routine exceeds the first target braking torque Ttag1 set in step S120 or step S123 (whether the required torque Tr* (last value) is larger than the first target braking torque Ttag1 as a braking torque) (step S140). When it is determined in step S140 that the last value of the required torque Tr* exceeds the first target braking torque Ttag1 and has not reached the first target braking torque Ttag1, the HV ECU 70 sets the flag F to a value of 0 (step S150). Furthermore, the HV ECU 70 sets the required torque Tr* to a larger one (a smaller one in absolute value and a smaller one as a braking torque) of the first target braking torque Ttag1 set in step S120 or step S123 and the sum of the last value of the required torque Tr* and the first rate ΔT1 set in step S120 or step S123 (step S160).

When it is determined in step S140 that the last value of the required torque Tr* is smaller than or equal to the first target braking torque Ttag1 (larger than or equal to the first target braking torque Ttag1 as a braking torque) and has reached the first target braking torque Ttag1, the HV ECU 70 sets the flag F to a value of 1 (step S155). Furthermore, the HV ECU 70 sets the required torque Tr* to a smaller one (a larger one in absolute value and a larger one as a braking torque) of the second target braking torque Ttag2 set in step S120 or step S123 and the sum of the last value of the required torque Tr* and the second rate ΔT2 set in step S120 or step S123 (step S165). When the flag F is set to a value of 1 in step S155, negative determination is made in step S130 thereafter, and the required torque Tr* is set to a smaller one of the second target braking torque Ttag2 and the sum of the last value of the required torque Tr* and the second rate ΔT2.

After the process of step S160 or step S165, the HV ECU 70 sets the torque command Tm1* of the motor generator MG1 (step S170). In step S170, when the target rotation speed Ne* of the engine 10 is other than a value of 0, the HV ECU 70 calculates the target rotation speed Nm1* by using the following mathematical expression (1), and sets the torque command Tm1* for the motor generator MG1 by using the following mathematical expression (2) (step S170). "ρ" in the mathematical expression denotes the gear ratio of the planetary gear 30, and "Gr" denotes the gear ratio of the speed reducer 36. The mathematical expression (2) is a relational expression in feedback control for bringing the rotation speed of the engine 10 (crankshaft) into coincidence with the target rotation speed Ne* by rotating the motor generator MG1 at the target rotation speed Nm1*. In the mathematical expression (2), the second term "k1" on the right-hand side denotes a gain of a feedback proportional term, and the third term "k2" on the right-hand side denotes a gain of a feedback integral term. In step S170, when the target rotation speed Ne* of the engine 10 is a value of 0, the HV ECU 70 sets the torque command Tm1* for the motor generator MG1 to a value of 0 (step S170).

$$Nm1^* - Ne^* \cdot (1+\rho)/\rho - Nm2/(Gr \cdot \rho) \quad (1)$$

$$Tm1^* - \text{Last} \cdot Tm1^* + k1 \cdot (Nm1^* - Nm1) + k2 \cdot f(Nm1^* - Nm1)dt \quad (2)$$

Furthermore, the HV ECU 70 sets the torque command Tm2* for the motor generator MG2 (step S180). In step S180, the HV ECU 70 calculates an upper limit torque Tmax and lower limit torque Tmin of torque that is outputtable from the motor generator MG2 by using the following mathematical expressions (3) and (4), and calculates a temporary torque Tm2tmp that is a temporary value of torque to be output from the motor generator MG2 by using the following mathematical expression (5). The HV ECU 70 sets the torque command Tm2* for the motor generator MG2 to a larger one of the lower limit torque Tmin and a smaller one of the temporary torque Tm2tmp and the upper limit torque Tmax. After the torque command Tm1* is set for the motor generator MG1 and the torque command Tm2* is set for the motor generator MG2 in this way, the HV ECU 70 transmits the torque command Tm1* and the torque command Tm2* to the MG ECU 55 (step S190), and executes the processes from step S100 again. When the MG ECU 55 has received the torque command Tm1* and the torque command Tm2*, the MG ECU 55 executes switching control over the first and second inverters 51, 52, and the like, in accordance with the torque command Tm1* and the torque command Tm2*. When the engine 10 is being operated, supply of fuel to the engine 10 is stopped in response to a release of depression of the accelerator pedal 84.

$$Tmin = (Win - Tm1^* \cdot Nm1)/Nm2 \quad (3)$$

$$Tmax = (Wout - Tm1^* \cdot Nm1)/Nm2 \quad (4)$$

$$Tm2tmp = (Tr^* + Tm1^*/\rho)/Gr \quad (5)$$

As a result of execution of the above-described routine shown in FIG. 2, when depression of the accelerator pedal 84 is released by the driver and the B position is selected as the shift position SP, and when the drive mode is the CS mode (or when the drive mode is the CS mode and the engine 10 is being operated), the engine 10 in a state where fuel is cut off is subjected to motoring by the motor generator MG1 such that the crankshaft rotates at the target rotation speed Ne* based on the vehicle speed V. Thus, as indicated by the continuous line in FIG. 3, it is possible to increase the rotation speed Ne of (race) the engine 10, and output the friction torque of the engine 10 to the drive shaft 35. At this time, the excess or deficiency of friction torque with respect to the required torque Tr* is adjusted through a torque output or regeneration with the use of the motor generator MG2. When depression of the accelerator pedal 84 is released by the driver and the B position is selected (time t0 in FIG. 3), the required torque Tr* is set so as to vary to the first target braking torque Ttag1 in accordance with the first rate ΔT1 (time t1 in FIG. 3) and then vary to the second target braking torque Ttag2 in accordance with the second rate ΔT2. As a result, when the drive mode is the CS mode, it is possible to decelerate the hybrid vehicle 1 through a shift change from the D position to the B position in the accelerator off state more quickly than when the D position is selected, and improve a deceleration feeling at the time of the shift operation by properly varying the rotation speed Ne (engine sound) of the engine 10.

In contrast, when the drive mode is the CD mode (and the operation of the engine 10 is stopped), and when depression of the accelerator pedal 84 is released by the driver and the B position is selected as the shift position SP, the target rotation speed Ne* of the engine 10 and the torque command Tm1* of the motor generator MG1 are set to a value of 0 (step S125, step S170). For this reason, the engine 10 is not subjected to motoring by the motor generator MG1, and a braking torque based on the required torque Tr* is solely output from the motor generator MG2. Therefore, when the drive mode is the CD mode (and the operation of the engine 10 is stopped), even when depression of the accelerator pedal 84 is released by the driver and the B position is selected as the shift position SP, the rotation speed Ne of the engine 10 does not vary and is kept at a value of 0 (see the dashed line in FIG. 3).

When the drive mode is the CD mode as well, after depression of the accelerator pedal 84 is released by the driver and the B position is selected, the required torque Tr* is set so as to vary to the first target braking torque Ttag1 in accordance with the first rate ΔT1 and then vary to the second target braking torque Ttag2 in accordance with the second rate ΔT2. However, when the drive mode is the CD mode, the value of the second rate ΔT2 corresponding to the same vehicle speed V is set so as to be smaller than the value of the second rate ΔT2 in the case where the drive mode is the CS mode, and a time that is taken until the required torque Tr* (braking torque) converges to the second target braking torque Ttag2 extends (time t2'>time t2 in FIG. 3). Therefore, as is apparent from FIG. 3, an integral value (accumulated value) of braking torque that is output during a period from when depression of the accelerator pedal 84 is released and the B position is selected as the shift position SP to when the required torque Tr* reaches the second target braking torque Ttag2 in the case where the drive mode is the CD mode is larger than the integral value in the case where the drive mode is the CS mode.

Thus, in the case where the drive mode is the CD mode, even when the rotation speed Ne (engine sound) of the engine 10 is not varied, it is possible to compensate for deterioration of deceleration feeling, that is, an atmospheric deficiency of deceleration feeling, resulting from no change in the rotation speed Ne while a change in the vehicle speed V is substantially similar between the CD mode and the CS mode. As a result, in the hybrid vehicle 1, it is possible to suppress a difference in deceleration feeling between the CD mode and the CS mode at the time when a shift operation for decelerating from the D position to the B position is performed.

As in the case of the routine shown in FIG. 2, by changing the second rate ΔT2 between the CD mode and the CS mode, it is possible to more easily increase an integral value of the braking torque by extending a time that is taken until the required torque Tr* (braking torque) converges to the second target braking torque Ttag2 in the case where the drive mode is the CD mode than in the case where the drive mode is the CS mode. However, in step S123 of the routine shown in FIG. 2, instead of the second rate ΔT2 or in addition to the second rate ΔT2, at least any one of the first target braking torque Ttag1, the second target braking torque Ttag2 and the first rate ΔT1 may be changed between the CD mode and the CS mode.

Figure 4:
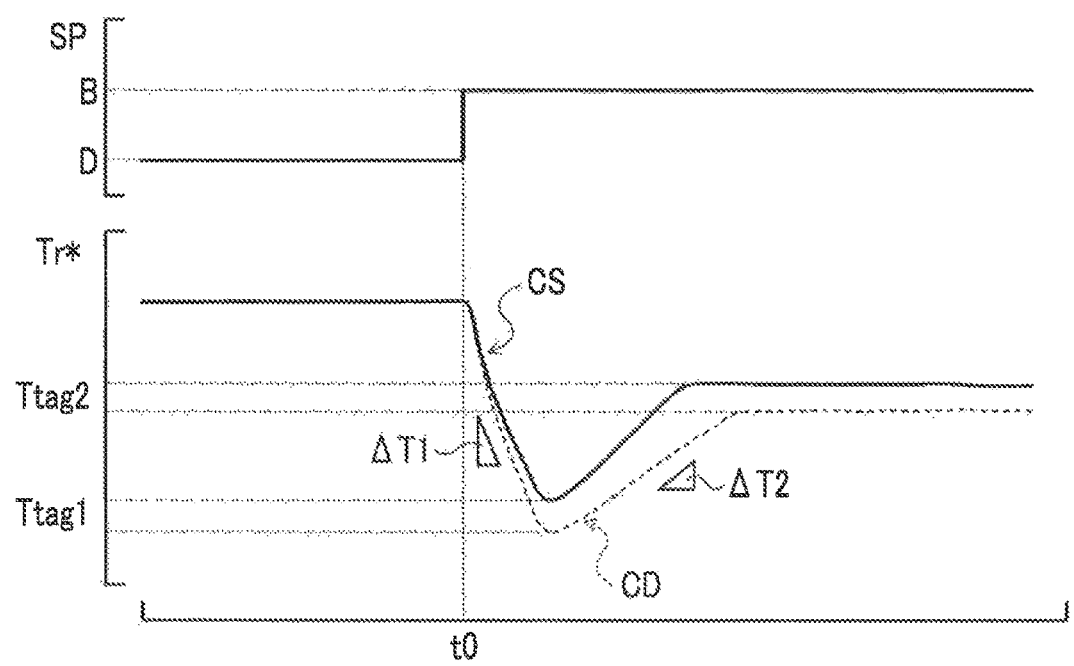
FIG. 4 is a timing chart that shows another example of a temporal change in required torque at the time when depression of the accelerator pedal is released and the shift position is the brake position.

That is, in step S123, as shown in FIG. 4, the first target braking torque Ttag1 may be increased as compared to when the drive mode is the CS mode. In this case, in addition to the CS mode-exclusive map that defines the relationship between the vehicle speed V and the first target braking torque Ttag1 at the time when the CS mode is set, a CD mode-exclusive map in which (the absolute value of) the first target braking torque Ttag1 corresponding to the same vehicle speed V is larger as a braking torque than the first target braking torque Ttag1 in the CS mode-exclusive map just needs to be prepared as the first target braking torque setting map that defines the relationship between the vehicle speed V and the first target braking torque Ttag1. With this configuration as well, it is possible to set an integral value of the braking torque such that the integral value in the case where the drive mode is the CD mode is larger than the integral value in the case where the drive mode is the CS mode.

In step S123, as shown in FIG. 4, the second target braking torque Ttag2 may be increased (increased in absolute value) as compared to when the drive mode is the CS mode. In this case, as the second target braking torque setting map that defines the relationship between the vehicle speed V and the second target braking torque Ttag2, in addition to the CS mode-exclusive map that defines the relationship between the vehicle speed V and the second target braking torque Ttag2 at the time when the CS mode is set, a CD mode-exclusive map in which (the absolute value of) the second target braking torque Ttag2 corresponding to the same vehicle speed V is larger as a braking torque than the second target braking torque Ttag2 in the CS mode-exclusive map just needs to be prepared. With this configuration as well, it is possible to set an integral value of the braking torque such that the integral value in the case where the drive mode is the CD mode is larger than the integral value in the case where the drive mode is the CS mode.

Furthermore, in step S123, as shown in FIG. 4, the absolute value of the first rate ΔT1 may be increased as compared to when the drive mode is the CS mode. That is, when the drive mode is the CD mode, a time that is taken from when depression of the accelerator pedal 84 is released and the B position is selected to when a braking torque (required torque Tr*) reaches the first target braking torque Ttag1 that is the maximum value may be shortened as compared to when the drive mode is the CS mode. In this case, as the first rate setting map that defines the relationship between the vehicle speed V and the first rate ΔT1, in addition to the CS mode-exclusive map that defines the relationship between the vehicle speed V1 and the first rate ΔT1 at the time when the CS mode is set, a CD mode-exclusive map in which the absolute value of the first rate ΔT1 corresponding to the same vehicle speed V is larger than the absolute value of the first rate ΔT1 in the CS mode-exclusive map. With this configuration as well, by changing the first target braking torque Ttag1 or the second rate ΔT2 between the CD mode and the CS mode as needed, it is possible to set an integral value of the braking torque such that the integral value in the case where the drive mode is the CD mode is larger than the integral value in the case where the drive mode is the CS mode. In any case, by changing at least any one of the first target braking torque Ttag1, the second target braking torque Ttag2, the first rate ΔT1 and the second rate ΔT2 between the CD mode and the CS mode, it is possible to set an integral value of the braking torque such that the integral value in the case where the drive mode is the CD mode is larger than the integral value in the case where the drive mode is the CS mode.

The hybrid vehicle 1 may include a transmission mechanism (stepped transmission) provided between the drive shaft 35 and the differential gear 39. The hybrid vehicle 1 may be configured as a non-plug-in hybrid vehicle if any one of the CD mode and the CS mode is allowed to be set as the drive mode. Furthermore, the shift device 80 of the hybrid vehicle 1 may include a sequential shift position (S position) that enables selection of any virtual shift stage from among a plurality of virtual shift stages, or a set of an upshift command position and a downshift command position.

In the thus configured hybrid vehicle 1 that is able to select a virtual shift stage, the relationship between the vehicle speed V and the required torque Tr* (required braking torque) in the accelerator off state is determined for the plurality of virtual shift stages such that the required torque Tr* for the same vehicle speed V is increased as a braking torque as the shift stage number reduces. In this case, the relationship between the vehicle speed V and the target rotation speed Ne (lower limit rotation speed) of the engine 10 in the accelerator off state is determined such that the target rotation speed Ne* for the same vehicle speed V is increased as the shift stage number reduces. Therefore, in the hybrid vehicle 1 that enables selection of a virtual shift stage, the power generation device 20 may be controlled such that an integral value (accumulated value) of braking torque that is output by the time the required torque Tr* reaches the second target braking torque Ttag2 in response to a release of depression of the accelerator pedal 84 and a downshift operation of the virtual shift stage in the case where the drive mode is the CD mode is larger than the integral value in the case where the drive mode is the CS mode.

Figure 5:
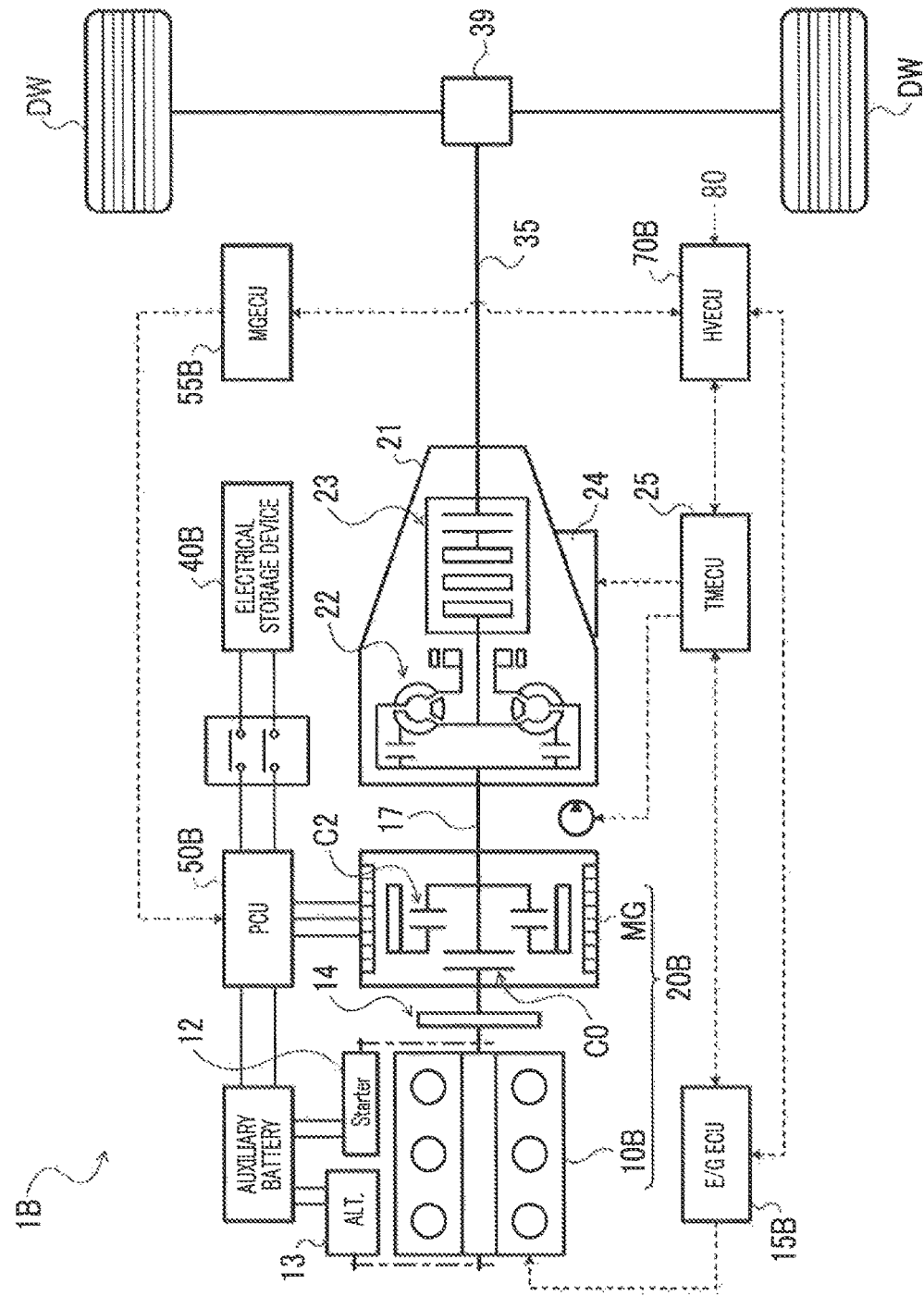
FIG. 5 is a schematic configuration view that shows another hybrid vehicle according to the disclosure.

FIG. 5 is a schematic configuration view that shows another hybrid vehicle 1B according to the disclosure. The hybrid vehicle 1B shown in FIG. 5 is a parallel hybrid vehicle that includes a power generation device 20B, a power transmission device 21 and an HV ECU 70B. The power generation device 20B includes an engine 10B and a motor generator MG. The HV ECU 70B serves as an electronic control unit that controls the overall vehicle.

The engine 10B is an internal combustion engine that is controlled by the engine ECU 15B. The engine 10B includes a starter (engine starting device) 12, an alternator 13, and the like. The alternator 13 generates electric power when driven by the engine 10B. The motor generator MG is a synchronous generator-motor that exchanges electric power with an electrical storage device 40B via a PCU 50B that is controlled by an MG ECU 55B. The power generation device 20B includes a normally-open clutch C0 (first clutch) and a normally-closed clutch C2 (second clutch) in addition to the engine 10B and the motor generator MG. The normally-open clutch C0 connects the crankshaft of the engine 10B and a transmission shaft 17 to each other via a flywheel damper 14 or releases the connection. The normally-closed clutch C2 connects the rotor of the motor generator MG and the transmission shaft 17 to each other or releases the connection.

The power transmission device 21 includes a starting device 22, a mechanical oil pump, a transmission mechanism (automatic transmission) 23, a hydraulic control device 24, and the like. The starting device 22 includes a lockup clutch, a torque converter (fluid transmission device), a damper device (not shown), and the like. The transmission mechanism 23 is, for example, configured as a four-speed to ten-speed transmission. The transmission mechanism 23 includes a plurality of planetary gears, a plurality of clutches (frictional engagement elements) and a plurality of brakes (frictional engagement elements). The transmission mechanism 23 shifts the speed of power transmitted from the transmission shaft 17 via the starting device 22 in multiple steps and outputs the power to the drive shaft 35 as an output shaft. The hydraulic control device 24 is controlled by a transmission electronic control unit (hereinafter, referred to as TM ECU) 25 that is a microcomputer including a CPU, and the like (not shown). The hydraulic control device 24 regulates hydraulic pressure from the mechanical oil pump or an electric oil pump and supplies the hydraulic pressure to the lockup clutch and the clutches and brakes of the transmission mechanism 23. A hydraulic pressure from the hydraulic control device 24 is also supplied to the clutches C0, C2 of the power generation device 20B. The clutches C0, C2 are controlled by the TM ECU 25 in response to command signals from the HV ECU 70B.

The thus configured hybrid vehicle 1B, after a system startup, starts moving by using power from the motor generator MG in a state where the clutch C0 is released and the clutch C2 is engaged. In the hybrid vehicle 1B as well, the HV ECU 70B sets the CD mode for the drive mode when the SOC of the electrical storage device 40B exceeds a predetermined first threshold S1 at a system startup. When the SOC of the electrical storage device 40B becomes lower than or equal to a second threshold S2 lower than the first threshold S1 while the hybrid vehicle 1B is traveling in a state where the CD mode is set, the HV ECU 70B changes the drive mode from the CD mode to the CS mode.

When a predetermined engine start condition is satisfied after the hybrid vehicle 1B starts moving, the HV ECU 70B transmits a command to engage the clutch C0 to the TM ECU 25. After the clutch C0 is engaged, the HV ECU 70 controls the motor generator MG such that the motor generator MG cranks the engine 10B and starts the engine 10B by starting fuel injection and ignition in cooperation with the engine ECU 15B and the MG ECU 55B. After the clutch C0 is engaged and the engine 10B is started in this way, it is possible to charge the electrical storage device 40B with electric power that is generated by the motor generator MG or output a torque from both the engine 10B and the motor generator MG by driving the motor generator MG by using electric power from the electrical storage device 40B while the engine 10B is operated at an operating point near an optimal fuel efficiency line on the basis of the SOC of the electrical storage device 40B.

Furthermore, in the above-described hybrid vehicle 1B as well, the engine 10B, the motor generator MG (power generation device 20B), the transmission mechanism 23, and the like, are controlled such that a braking torque that is output from the power generation device 20B in the accelerator off state where depression of the accelerator pedal (and brake pedal) is released by the driver in the case where the B position is selected as the shift position SP of the shift device 80 is larger than the braking torque in the case where the D position is selected. That is, when the clutch C0 is released, and when depression of the accelerator pedal 84 is released by the driver and the B position is selected as the shift position SP, a braking torque corresponding to the required torque Tr* (required braking torque) is output by the motor generator MG. When the clutch C0 is engaged, and when depression of the accelerator pedal 84 is released by the driver and the B position is selected as the shift position SP, at least any one of the friction torque of the engine 10B and a regenerative braking torque (or a driving torque) from the motor generator MG is output to the drive shaft 35 in response to the required torque Tr* (required braking torque) while the speed position of the transmission mechanism 23 is changed as needed.

In the hybrid vehicle 1B as well as the above-described hybrid vehicle 1, when depression of the accelerator pedal 84 is released by the driver and the B position is selected, the power generation device 20B is controlled such that an integral value (accumulated value) of braking torque that is output by the time the required torque Tr* reaches the second target braking torque Ttag2 in the case where the drive mode is the CD mode is larger than the integral value in the case where the drive mode is the CS mode. Thus, in the hybrid vehicle 1B as well, it is possible to suppress a difference in deceleration feeling between the CD mode and the CS mode at the time of a shift change from the D position to the B position for deceleration.

The hybrid vehicle 1B may be configured as a plug-in hybrid vehicle that is able to charge the electrical storage device 40B with electric power from an external power supply. The hybrid vehicle 1B may be configured as a four-wheel drive vehicle that distributes power, output to the drive shaft 35, among front wheels and rear wheels with the use of a transfer (not shown). Furthermore, when the hybrid vehicle 1B is configured to be able to manually change the speed position of the transmission mechanism 23 via the shift device 80, the power generation device 20B is controlled such that an integral value of braking torque that is output during a period from when depression of the accelerator pedal 84 is released and a downshift operation of the transmission mechanism 23 is performed to when a predetermined time elapses in the case where the drive mode is the CD mode is larger than the integral value in the case where the drive mode is the CS mode.

As described above, the HV ECU 70 that is the electronic control unit of the hybrid vehicle 1 according to the disclosure controls the power generation device 20 such that an integral value of braking torque that is output during a period from when depression of the accelerator pedal 84 is released and a shift operation for deceleration, such as selecting the B position, is performed to when the predetermined time elapses in the case where the drive mode is the CD mode is larger than the integral value in the case where the drive mode is the CS mode. Similarly, the HV ECU 70B that is the electronic control unit of the hybrid vehicle 1B according to the disclosure controls the power generation device 20B such that an integral value of braking torque that is output during a period from when depression of the accelerator pedal 84 is released and a shift operation for deceleration, such as selecting the B position, is performed to when the predetermined time elapses in the case where the drive mode is the CD mode is larger than the integral value in the case where the drive mode is the CS mode. Thus, when the drive mode is the CD mode, even when the rotation speed Ne (engine sound) of the engine 10 or engine 10B is not changed, it is possible to compensate for deterioration of deceleration feeling due to no change in the rotation speed Ne, that is, a deficiency of atmospheric deceleration feeling. As a result, it is possible to suppress a difference in deceleration feeling between the CD mode and the CS mode at the time when a shift operation for deceleration is performed.

The disclosure of the disclosure is not limited to the above-described embodiments. The above-described embodiments, of course, may be variously modified within the scope of extension of the disclosure. In addition, the embodiments of the disclosure are only specific examples of the disclosure described in SUMMARY, and do not limit the elements of the disclosure described in SUMMARY.

The disclosure of the disclosure is usable in manufacturing industries of hybrid vehicles.

What is claimed is:

1. A hybrid vehicle comprising:
    a power generation device including an engine and an electric motor;
    an electrical storage device configured to exchange electric power with the electric motor;
    a shift device configured to allow a driver to perform a shift operation for deceleration; and
    an electronic control unit configured to control the power generation device such that an integral value of braking torque when a drive mode of the hybrid vehicle is a charge depleting mode is larger than the integral value of the braking torque when the drive mode is a charge sustaining mode,
        the braking torque being a torque that is output from the power generation device during a period from when depression of an accelerator pedal is released and the shift operation is performed to when a predetermined time elapses.

2. The hybrid vehicle according to claim 1, wherein the electronic control unit is configured to control the power generation device such that a first period when the drive mode is the charge depleting mode is longer than the first period when the drive mode is the charge sustaining mode,
    the first period is a period that is taken from when depression of the accelerator pedal is released and the shift operation is performed to when the braking torque converges.

3. The hybrid vehicle according to claim 1, wherein the electronic control unit is configured to control the power generation device such that a maximum value of the braking torque when the drive mode is the charge depleting mode is larger than the maximum value of the braking torque when the drive mode is the charge sustaining mode.

4. The hybrid vehicle according to claim 1, wherein the electronic control unit is configured to control the power generation device such that a second period when the drive mode is the charge depleting mode is shorter than the second period when the drive mode is the charge sustaining mode,
    the second period is a period from when depression of the accelerator pedal is released and the shift operation is performed to when the braking torque reaches a maximum value.

5. The hybrid vehicle according to claim 1, wherein the electronic control unit is configured to:
    set a required braking torque of the power generation device such that the required braking torque varies to a second target braking torque in accordance with a second rate after the required braking torque varies to a first target braking torque in accordance with a first rate in response to a release of depression of the accelerator pedal and the shift operation,
        the second target braking torque being smaller as a braking torque than the first target braking torque; and
    vary at least one of the first target braking torque, the second target braking torque, the first rate and the second rate between the charge depleting mode and the charge sustaining mode such that the integral value of the braking torque when the drive mode is the charge depleting mode is larger than the integral value when the drive mode is the charge sustaining mode.

6. The hybrid vehicle according to claim 1, wherein the electronic control unit is configured to:
    control the power generation device such that the power generation device outputs the braking torque without changing a rotation speed of the engine in response to a release of depression of the accelerator pedal and the shift operation when the drive mode is the charge depleting mode; and
    control the power generation device such that the power generation device outputs the braking torque while the rotation speed of the engine is changed in response to the release of depression of the accelerator pedal and the shift operation when the drive mode is the charge sustaining mode.

7. The hybrid vehicle according to claim 1, wherein the shift device is configured to allow the driver to select one of a drive position and a brake position, and the shift operation is a shift change from the drive position to the brake position.

8. A control method for a hybrid vehicle,
    the hybrid vehicle includes a power generation device, an electrical storage device, a shift device, and an electronic control unit,
        the power generation device including an engine and an electric motor,
        the electrical storage device being configured to exchange electric power with the electric motor,
        the shift device being configured to allow a driver to perform a shift operation for deceleration,
    the control method comprising:
    controlling, by the electronic control unit, the power generation device such that an integral value of braking torque when a drive mode of the hybrid vehicle is a charge depleting mode is larger than the integral value of the braking torque when the drive mode is a charge sustaining mode,
        the braking torque being a torque that is output from the power generation device during a period from when depression of an accelerator pedal is released and the shift operation is performed to when a predetermined time elapses.

* * * * *